(12) United States Patent
Wang

(10) Patent No.: US 12,495,463 B2
(45) Date of Patent: Dec. 9, 2025

(54) EARLY DATA TRANSMISSION METHODS AND COMMUNICATION DEVICE FOR EARLY DATA TRANSMISSION USING A MESSAGE 3 (MSG3)

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 826 days.

(21) Appl. No.: 17/561,990

(22) Filed: Dec. 26, 2021

(65) Prior Publication Data

US 2022/0124585 A1 Apr. 21, 2022

Related U.S. Application Data

(63) Continuation of application No. PCT/CN2019/093353, filed on Jun. 27, 2019.

(51) Int. Cl.
*H04W 72/1268* (2023.01)
*H04L 1/08* (2006.01)
(Continued)

(52) U.S. Cl.
CPC .............. *H04W 76/25* (2018.02); *H04L 1/08* (2013.01); *H04W 16/24* (2013.01);
(Continued)

(58) Field of Classification Search
CPC ...... H04L 49/115; H04L 47/31; H04W 36/04; H04W 16/24; H04W 74/0833;
(Continued)

(56) References Cited

U.S. PATENT DOCUMENTS

2016/0119922 A1* 4/2016 Ye .................. H04W 16/14
370/336
2018/0324869 A1 11/2018 Phuyal et al.
(Continued)

FOREIGN PATENT DOCUMENTS

CN 106792608 5/2017
CN 107925525 4/2018
(Continued)

OTHER PUBLICATIONS

R2-1713056, "Remaining Issues in Early Data Transmission over NAS", Nov. 27-Dec. 1, 2017, pp. 1-7 (Year: 2017).*
(Continued)

*Primary Examiner* — Salvador E Rivas
(74) *Attorney, Agent, or Firm* — Hodgson Russ LLP

(57) ABSTRACT

Data transmission methods and a communication device are provided. The method includes the following. A terminal device transmits an uplink message, where the uplink message includes a first message 3 (MSG3) for accessing a first cell, and the first MSG3 includes uplink early data stored in non-access stratum (NAS) information, or the uplink message includes the first MSG3 for accessing the first cell and the uplink early data. The first MSG3 carries indication information, and the indication information indicates whether the uplink early data is retransmission data.

18 Claims, 11 Drawing Sheets

(51) Int. Cl.
*H04W 16/24* (2009.01)
*H04W 36/02* (2009.01)
*H04W 76/25* (2018.01)
*H04L 47/31* (2022.01)
*H04L 49/115* (2022.01)
*H04W 74/0833* (2024.01)

(52) U.S. Cl.
CPC ..... *H04W 36/023* (2013.01); *H04W 72/1268* (2013.01); *H04L 47/31* (2013.01); *H04L 49/115* (2022.05); *H04W 74/0833* (2013.01)

(58) Field of Classification Search
CPC ........... H04W 74/004; H04W 72/1268; H04W 72/1284; H04J 11/0069; H04J 11/0079
See application file for complete search history.

(56) References Cited

U.S. PATENT DOCUMENTS

| | | | |
|---|---|---|---|
| 2019/0141515 A1 | 5/2019 | Kim et al. | |
| 2019/0306873 A1* | 10/2019 | Lin | H04W 72/1268 |
| 2019/0394808 A1* | 12/2019 | Lee | H04W 28/18 |
| 2020/0037367 A1* | 1/2020 | Kim | H04W 74/006 |
| 2020/0068547 A1* | 2/2020 | Li | H04W 8/24 |
| 2020/0170045 A1* | 5/2020 | Lee | H04W 74/006 |
| 2020/0187245 A1* | 6/2020 | Fujishiro | H04W 72/21 |
| 2020/0236598 A1* | 7/2020 | Kim | H04W 74/0833 |
| 2020/0288319 A1* | 9/2020 | Pham Van | H04W 74/0833 |
| 2021/0029724 A1* | 1/2021 | Tsai | H04W 28/0278 |
| 2021/0037553 A1* | 2/2021 | Wong | H04W 74/006 |
| 2021/0045026 A1* | 2/2021 | Lee | H04W 76/27 |
| 2022/0418029 A1* | 12/2022 | Tirronen | H04L 5/0053 |

FOREIGN PATENT DOCUMENTS

| | | | |
|---|---|---|---|
| CN | 109155963 A | | 1/2019 |
| CN | 109863783 A | | 6/2019 |
| CN | 109155963 B | | 4/2021 |
| WO | 2014166030 | | 10/2014 |
| WO | 2018212699 | | 11/2018 |
| WO | 2019030723 | A1 | 2/2019 |
| WO | 2019032222 | A1 | 2/2019 |
| WO | 2019074436 | | 4/2019 |
| WO | 2019102001 | A1 | 5/2019 |

OTHER PUBLICATIONS

R2-1701737, "Msg3 vs Msg1 for on-demand SI request", Feb. 13-17, 2017, pp. 1-2 (Year: 2017).*
Intel Corporation, "Handling UP EDT in new eNB", 3GPP TSG RAN WG2 Meeting #103bis, Sep. 28, 2018, R2-1814063.
EPO, Partial Supplementary European Search Report for EP 19935213.9, May 27, 2022.
Huawei et al., "RACH procedure in early data transmission", 3GPP TSG RAN WG2 Meeting #100, Nov. 17, 2017, R2-1713191.
Kyocera, "Remaining issues for basic functionality of EDT in eFeMTC/FeNB-IoT", 3GPP TSG-RAN WG2 #100, Nov. 17, 2017, R2-1713503, 7 pages, Reno, USA.
CNIPA, First Office Action for CN 201980090526.4, Apr. 7, 2022.
Huawei, "NB-IoT Early Data transmission," 3GPP TSG-RAN3 Meeting#97bis, R3-173518, Oct. 2017.
Intel Corporation, "Early data transmission discussion for eFeMTC and FeNBIoT," 3GPP TSG RAN WG2 Meeting #100, R2-1712639, Nov. 2017.
LG Electronics Inc., "Further discussion regarding [101#57] Email discussion," 3GPP TSG-RAN WG2 Meeting #101bis, R2-1805270, Apr. 2018.
WIPO, International Search Report for PCT/CN2019/093353, Mar. 26, 2020.
EPO, Extended European Search Report for EP Application No. 19935213.9, Aug. 31, 2022.
CNIPA, Second Office Action for CN Application No. 201980090526.4, Aug. 11, 2022.

* cited by examiner

500

```
┌─────────────────────────────────────────────────────────────┐
│ IN A CASE WHERE UPLINK EARLY DATA IS TRANSMITTED THROUGH A  │
│ CONTROL PLANE, TRANSMIT, BY A TERMINAL DEVICE, AN UPLINK    │
│ MESSAGE, WHERE THE UPLINK MESSAGE INCLUDES A FIRST MSG3 FOR │──── 510
│ ACCESSING A FIRST CELL, AND THE FIRST MSG3 INCLUDES THE UPLINK│
│ EARLY DATA STORED IN NAS INFORMATION                        │
└─────────────────────────────────────────────────────────────┘
                              │
                              ▼
┌─────────────────────────────────────────────────────────────┐
│ IN A CASE WHERE THE SERVING CELL OF THE TERMINAL DEVICE IS  │
│ RESELECTED FROM THE FIRST CELL TO THE SECOND CELL, AT THE AS,│──── 530
│ MAINTAIN, BY THE TERMINAL DEVICE, A MAC CONFIGURATION OF THE │
│ FIRST CELL, AND SKIP NOTIFYING, BY THE TERMINAL DEVICE, AN NAS│
│ THAT THE SERVING CELL OF THE TERMINAL DEVICE IS RESELECTED  │
│ FROM THE FIRST CELL TO THE SECOND CELL                      │
└─────────────────────────────────────────────────────────────┘
                              │
                              ▼
┌─────────────────────────────────────────────────────────────┐
│ IN A CASE WHERE THE TERMINAL DEVICE FAILS TO RECEIVE A REPLY│──── 520
│ MSG4 FOR THE FIRST MSG3 AND A SERVING CELL OF THE TERMINAL  │
│ DEVICE IS RESELECTED FROM THE FIRST CELL TO A SECOND CELL,  │
│ TRANSMIT, BY THE TERMINAL DEVICE, A SECOND MSG3 FOR ACCESSING│
│ THE SECOND CELL, WHERE THE SECOND MSG3 INCLUDES THE UPLINK  │
│ EARLY DATA, AND THE UPLINK EARLY DATA IS OBTAINED BY THE    │
│ TERMINAL DEVICE AT AN AS FROM A MSG3 BUFFER                 │
└─────────────────────────────────────────────────────────────┘
```

FIG. 6

EARLY DATA TRANSMISSION METHODS AND COMMUNICATION DEVICE FOR EARLY DATA TRANSMISSION USING A MESSAGE 3 (MSG3)

CROSS REFERENCE TO RELATED APPLICATION(S)

This application is a continuation of International Application No. PCT/CN2019/093353, filed on Jun. 27, 2019, the entire disclosure of which is incorporated herein by reference.

TECHNICAL FIELD

Implementations of the present disclosure relate to the technical field of communication, and more particularly, to data transmission methods and a communication device.

BACKGROUND

At present, during early data transmission (EDT), a terminal device always stays in an idle state, a suspend state, or an inactive state to complete the early data transmission. However, during the EDT, the terminal device may perform cell reselection, which may lead to delivery failure of downlink early data or core network (CN) paging to transmit the downlink early data, thereby increasing signaling load. In addition, after the cell reselection, the terminal device may re-initiate a random access procedure based on a reselected cell, which may lead to repeated reception of uplink early data at the core network if the core network has received the uplink early data, thereby resulting in resource waste.

SUMMARY

In a first aspect, a data transmission method is provided. The method includes the following. A terminal device transmits an uplink message, where the uplink message includes a first message 3 (MSG3) for accessing a first cell, and the first MSG3 includes uplink early data stored in non-access stratum (NAS) information, or the uplink message includes the first MSG3 for accessing the first cell and the uplink early data. The first MSG3 carries indication information, and the indication information indicates whether the uplink early data is retransmission data.

In a second aspect, a communication device is provided. The communication device includes a processor, a transceiver, and a memory configured to store computer programs. The processor is configured to invoke and execute the computer programs stored in the memory to cause the transceiver to: transmit an uplink message, where the uplink message includes a first MSG3 for accessing a first cell, and the first MSG3 includes uplink early data stored in NAS information, or the uplink message includes the first MSG3 for accessing the first cell and the uplink early data. The first MSG3 carries indication information, and the indication information indicates whether the uplink early data is retransmission data.

In a third aspect, a data transmission method is provided. The method includes the following. A core network device receives a first message, where the first message includes uplink early data and indication information, the indication information indicates whether the uplink early data is retransmission data. The core network device determines whether the uplink early data is stored before the uplink early data is received, when the indication information indicates that the uplink early data is retransmission data. The core network device reserves or discards the uplink early data based on a determination of whether the uplink early data is stored.

BRIEF DESCRIPTION OF THE DRAWINGS

FIG. 6 is another schematic flowchart of a data transmission method provided in an implementation of the present disclosure.

DETAILED DESCRIPTION

The following will clearly and completely describe technical solutions in implementations of the present disclosure with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

The technical solutions of implementations of the present disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a 5th generation (5G) system.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the present disclosure can also be applied to these communication systems.

Optionally, a communication system in implementations of the present disclosure may be applied to a carrier aggregation (CA) scenario, a dual connectivity (DC) scenario, or a standalone (SA) network deployment scenario, etc.

Figure 1:
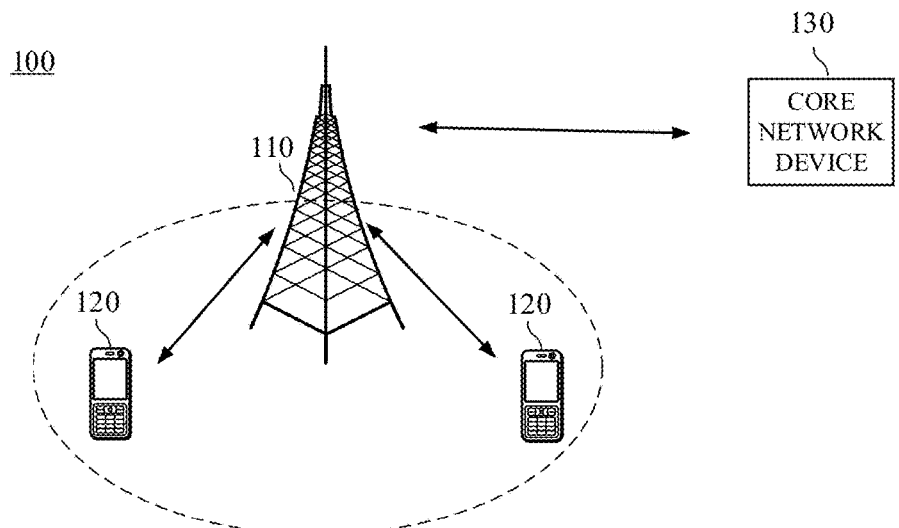
FIG. 1 is a schematic diagram of a communication system architecture provided in an implementation of the present disclosure.

Exemplary, FIG. 1 illustrates a communication system 100 of implementations of the present disclosure. The communication system 100 may include an access network device 110. The access network device 110 may be a device that communicates with a terminal device 120 (also referred to as a communication terminal or a terminal). The access network device 110 can provide a communication coverage for a specific geographical area and communicate with terminal devices in the coverage area. The access network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the access network device may be a mobile switching center, a relay station, an access point, an in-vehicle device, a wearable device, a hub, a switch, a bridge, a router, a network-side device in a 5G network, or an access network device in a future evolved public land mobile network (PLMN).

The communication system 100 further includes at least one terminal device 120 in a coverage area of the access network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Optionally, terminal devices 120 can communicate with each other through device to device (D2D) communication.

Optionally, the 5G system or 5G network can also be referred to as a new radio (NR) system or NR network.

FIG. 1 exemplarily illustrates a schematic diagram of a communication system 100. Optionally, the communication system 100 may also include multiple access network devices, and there can be other numbers of terminal devices in a coverage area of each of the access network devices, which is not limited herein.

Optionally, the communication system 100 may further include other network entities such as a network controller, a mobile management entity, or the like, and the disclosure is not limited in this regard.

It should be understood that, in implementations of the present disclosure, a device with communication functions in a network/system can be referred to as a "communication device". Taking the communication system 100 illustrated in FIG. 1 as an example, the communication device may include the access network device 110, the terminal device(s) 120, and a core network device 130 that have communication functions. The access network device 110 and the terminal device(s) 120 can be the devices described above and will not be repeated herein.

The core network device in implementations of the present disclosure may be a mobility management entity (MME), an access and mobility management function (AMF), etc., and the disclosure is not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

The following briefly introduces the development of 5G and possible application scenarios.

At present, along with pursuit of people for rate, delay, high-speed mobility, and efficiency, and diversification and complication of services in the future life, the international standard organization 3rd generation partnership project (3GPP) has started researching and developing the 5G technology. 5G is mainly applied to: enhanced mobile broadband (eMBB), ultra-reliable low-latency communication (URLLC), and massive machine-type communication (mMTC). eMBB is still aimed at obtaining multimedia content, services, and data for users and grows rapidly in demand. On the other hand, because eMBB may be deployed in different scenarios, such as indoor, urban, rural areas, etc., its capabilities and requirements vary widely. Therefore, analysis of eMBB should depend on specific deployment scenarios. Typical applications of URLLC may include: industrial automation, power automation, telemedicine operations, and traffic safety assurance. mMTC may be typically characterized by: high connection density, small amount of data, delay-insensitive services, low cost of modules, and long service life.

During early deployment of NR, it is difficult to implement complete NR coverage, and thus typically, wide area LTE coverage and an NR island coverage mode are applied for network coverage. Moreover, LTE is mostly deployed below 6 GHz, leaving few spectrums for 5G below 6 GHz, so researches on application of spectrums above 6 GHz for NR are required. However, the high band is limited in coverage and fast in signal fading. Meanwhile, for protecting early LTE investment of mobile operating companies, a working mode of tight interworking between LTE and NR is proposed. NR can also work independently. In 5G, a maximum channel bandwidth may be 400 MHZ (wideband carrier), which is large compared to a maximum bandwidth of 20 M in LTE.

Figure 2A:
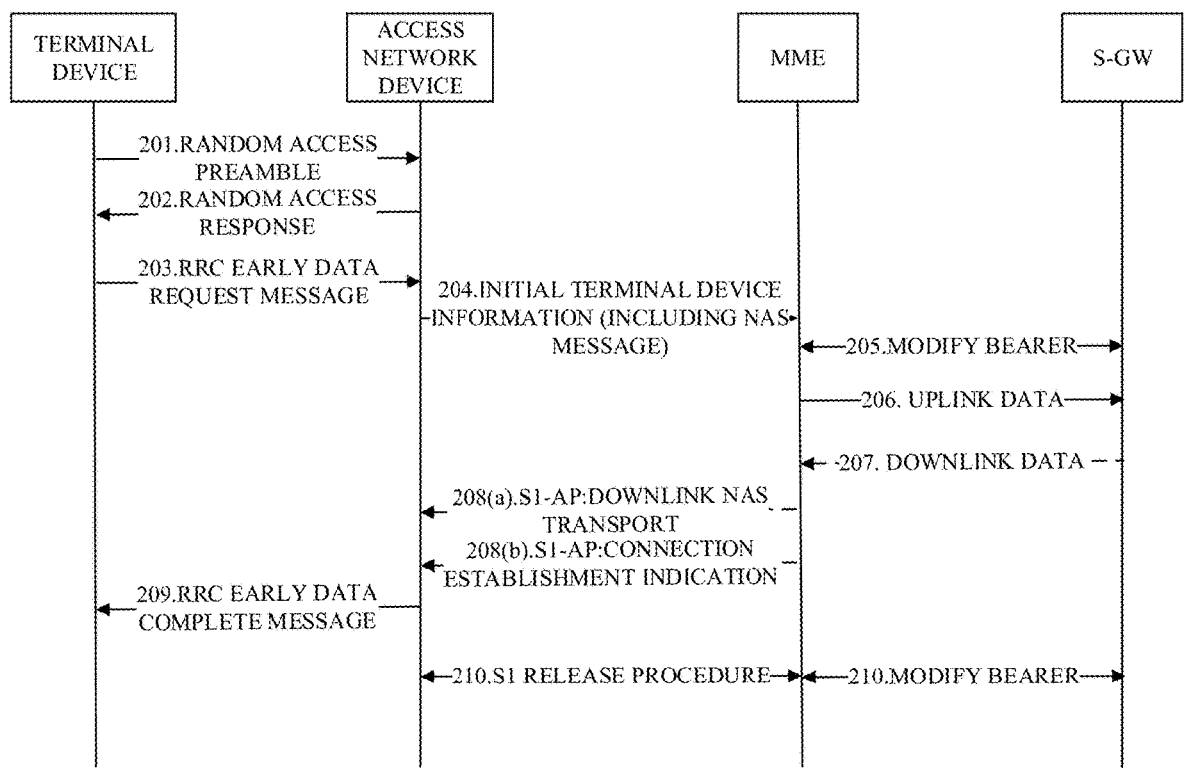
FIG. 2*a* is a schematic flowchart of early data transmission through a control plane provided in an implementation of the present disclosure.
Figure 2B:
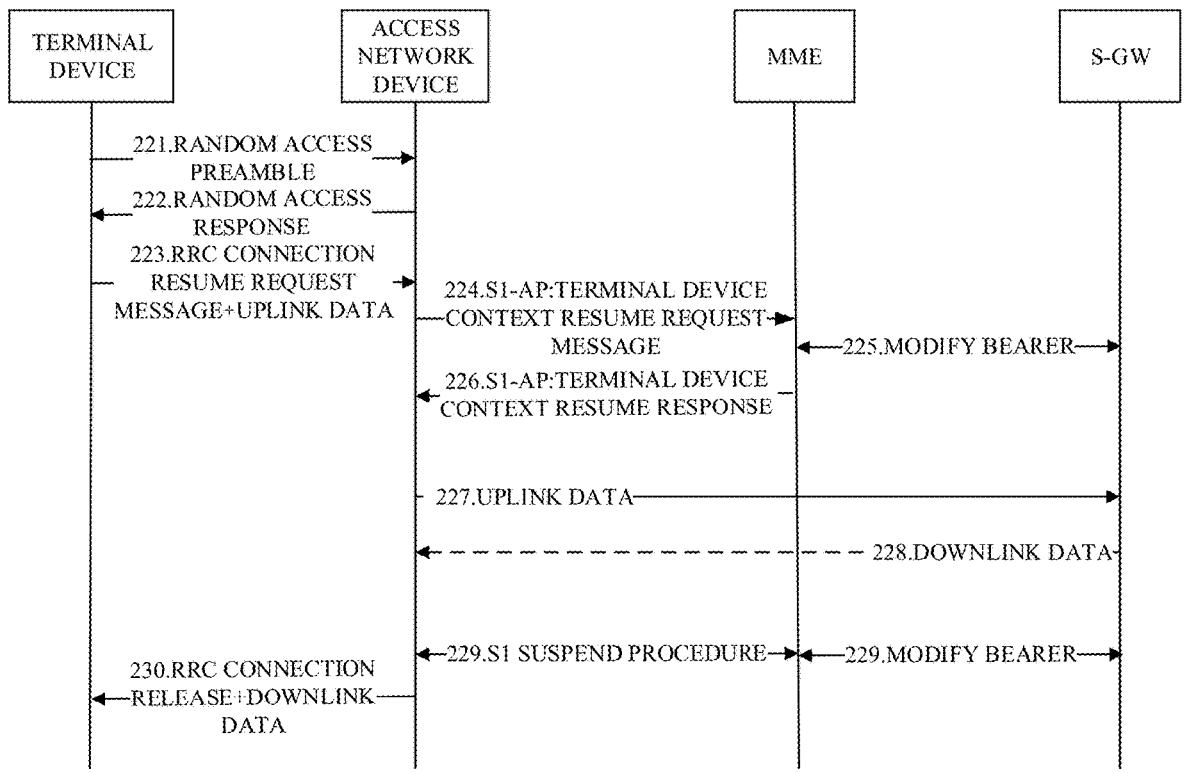
FIG. 2*b* is a schematic flowchart of early data transmission through a user plane provided in an implementation of the present disclosure.

In LTE, there is already early data transmission (EDT). During EDT, UE always stays in an idle state, a suspend state, or an inactive state to complete the early data transmission. As illustrated in FIGS. 2a and 2b, FIGS. 2a and 2b are schematic flowcharts of schemes of early data transmission through a control plane and a user plane, respectively.

The following briefly introduces the scheme of early data transmission through the control plane with reference to FIG. 2a. As illustrated in FIG. 2a, operations 201 to 210 may be included.

In 201, UE may randomly select a preamble sequence and transmit a random access preamble sequence, that is, a message 1 (MSG1), to an access network device on a random access channel (RACH).

In 202, after detecting that the preamble sequence is transmitted, the access network device may transmit in downlink a random access response, that is, a message 2 (MSG2). The random access response may contain at least the following information: the number of the preamble sequence received, timing adjustment information, indication information of location of an uplink resource allocated for the UE, and a cell radio network temporary identify (C-RNTI) temporarily allocated.

In 203, after receiving the random access response, the UE may transmit to the eNB a radio resource control (RRC) early data request message, that is, a message 3 (MSG3). The early data request message may include a system architecture evolution-temporary mobile subscriber identity (SAE-TMSI), an establishment cause, and dedicated non-access stratum (NAS) information, etc. The dedicated NAS information includes early data transmitted by the terminal device.

In 204, the access network device transmits initial terminal device information to an MME, where the initial terminal device information includes the dedicated NAS information.

In 205, a bearer is modified between the MME and a service-gate way (S-GW).

In 206, the MME transmits uplink early data to the S-GW.

In 207, the S-GW transmits downlink early data to the MME.

In 208(a), the MME transmits a downlink NAS transport to the access network device through an application protocol of an S1 interface, i.e., an S1 application protocol (S1-AP).

In 208(b), the MME transmits a connection establishment indication to the access network device through the S1-AP.

In 209, the access network device transmits to the UE an early data complete message, that is, a message 4 (MSG4).

In 210, a release procedure may be performed between the access network device and the MME through the S1 interface, and the bearer may be modified between the MME and the S-GW.

The scheme of early data transmission through the control plane is briefly introduced above with reference to FIG. 2a, and the scheme of early data transmission through the user plane is briefly introduced below with reference to FIG. 2b. As illustrated in FIG. 2b, operations 221 to 230 may be included.

In 221, UE may randomly select a preamble sequence and transmit a random access preamble sequence, that is, a MSG1, to an access network device on an RACH.

In 222, after detecting that the preamble sequence is transmitted, the access network device may transmit in downlink a random access response, that is, a MSG2. The random access response may contain at least the following information: the number of the preamble sequence received, timing adjustment information, indication information of location of an uplink resource allocated for the UE, and a C-RNTI temporarily allocated.

In 223, after receiving the random access response, the UE may transmit an RRC connection resume request message and uplink early data to the access network device. The RRC connection resume request message is a MSG3, and the MSG3 may include a resume identity (ID), a resume cause, and a resume message authentication code for integrity (MAC-I). The MSG3 may be carried on a common control channel (CCCH). The uplink early data may be carried on a dedicated physical channel (DPCH). These two channels are multiplexed at a media access control (MAC) layer and then transmitted to the access network device.

In 224, the access network device transmits a UE context resume request message to an MME through an S1-AP.

In 225, a bearer is modified between the MME and a S-GW.

In 226, the MME transmits a UE context resume response to the access network device.

In 227, the access network device transmits uplink early data to the S-GW.

In 228, the S-GW transmits downlink early data to the access network device.

In 229, the access network device and the MME perform an S1 suspend procedure, and the MME and the S-GW modify the bearer.

In 230, the access network device transmits an RRC connection release message and downlink data to the UE. The RRC connection release message is a MSG4, and the MSG4 may include a release cause, a resume ID, and a next hop chaining counter (NCC).

Figure 3:
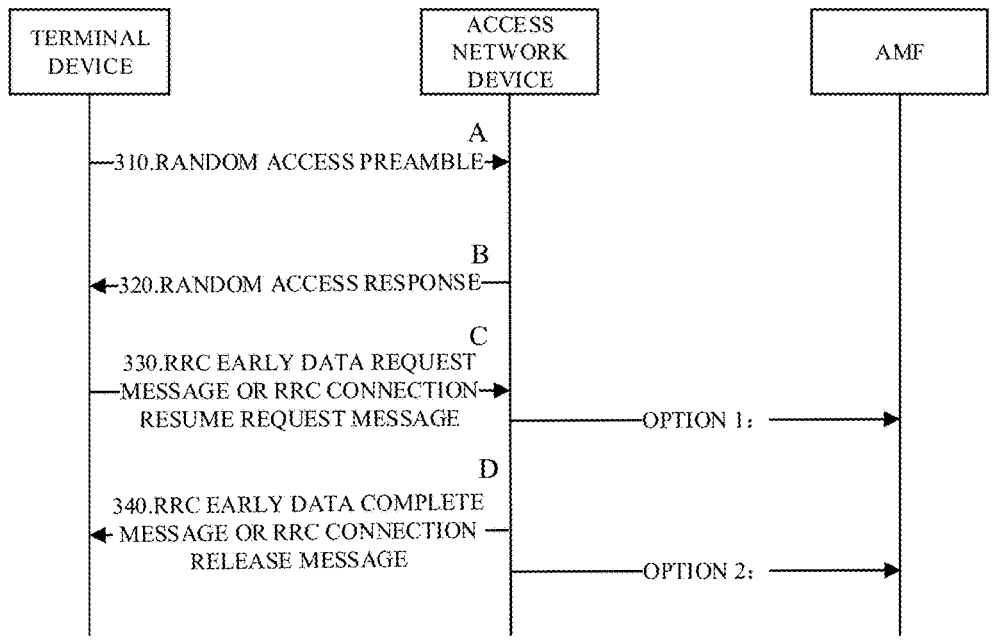
FIG. 3 is a schematic flowchart of early data transmission provided in an implementation of the present disclosure.

However, during early data transmission through the control plane and the user plane, the terminal device may perform cell reselection. As illustrated in FIG. 3, if the cell reselection occurs at points A, B, and C, that is, if the cell reselection occurs before the terminal device transmits an RRC early data request message or an RRC connection resume request message to an access network device, for the scheme of data transmission through the control plane and the user plane, the UE may reset MAC and an access stratum (AS) of the UE may notify an NAS that RRC connection establishment or resume fails. If the cell reselection occurs at point D, that is, if the cell reselection occurs after the terminal device transmits the RRC early data request message or the RRC connection resume request message to the access network device and before the terminal device receives an RRC early data complete message or an RRC connection release message, for the scheme of early data transmission through the control plane, the UE may reset the MAC and notify the NAS that the RRC connection establishment or resume fails, and for the scheme of early data transmission through the user plane, the early data transmission may be terminated.

The cell reselection may occur at point D. In this case, the cell reselection occurs when the terminal device has transmitted uplink early data to the access network device and has not received downlink early data, which may lead to delivery failure of early data or a need of core network (CN) paging to transmit the downlink early data, thereby increasing signaling load. In addition, after the cell reselection, the terminal device may re-initiate a random access procedure based on a reselected cell because the UE is not sure whether the access network device has received the uplink early data. If the CN has successfully received the uplink early data before, repeated transmissions may lead to repeated reception of the uplink early data at the CN, thereby resulting in resource waste.

Therefore, the following solution is provided in implementations of the present disclosure, to reduce signaling load and avoid resource waste, thereby ensuring reliability of early data transmission.

The solution provided in implementations of the present disclosure will be described in detail below with reference to FIG. 4.

Figure 4:
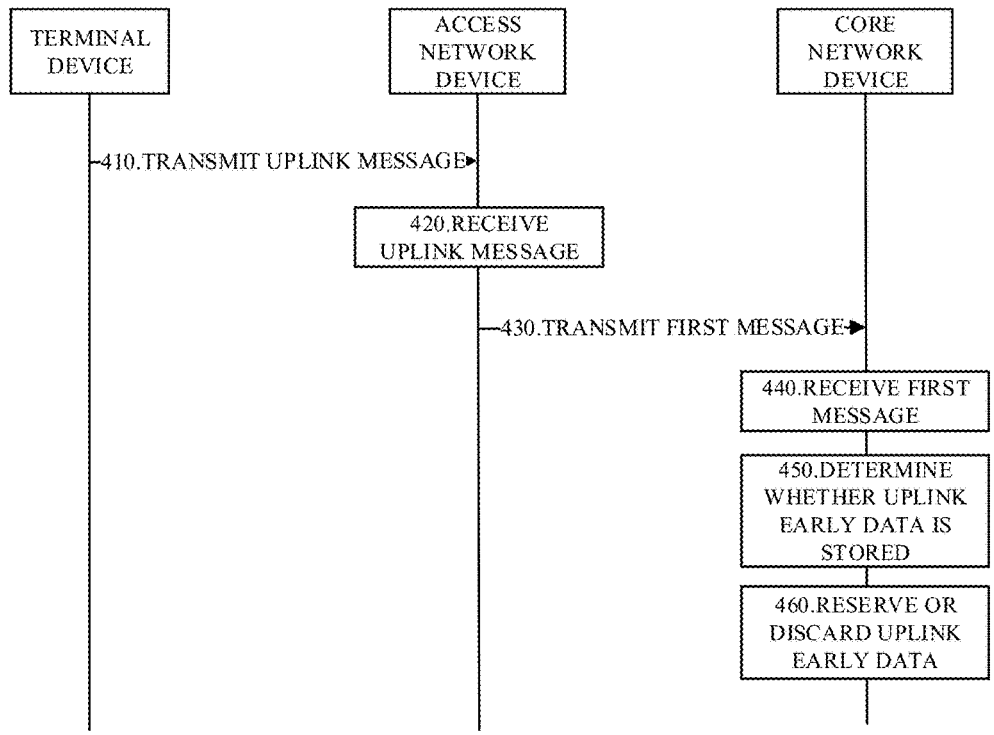
FIG. 4 is a schematic flowchart of a data transmission method provided in an implementation of the present disclosure.

As illustrated in FIG. 4, FIG. 4 illustrates a schematic flowchart of a data transmission method 400 according to an implementation of the present disclosure. The method 400 may include operations 410 to 460.

In 410, a terminal device transmits an uplink message. The uplink message includes a first MSG3 for accessing a first cell, and the first MSG3 includes uplink early data stored in NAS information, or the uplink message includes the first MSG3 for accessing the first cell and the uplink early data. The first MSG3 carries indication information, and the indication information indicates whether the uplink early data is retransmission data.

In implementations of the present disclosure, when the terminal device transmits the uplink message carrying the first MSG3, the first MSG3 may carry the indication information. The terminal device can determine whether the uplink early data transmitted is retransmission data, so the terminal device may carry the indication information in the first MSG3 to indicate whether the uplink early data is retransmission data.

In 420, an access network device receives the uplink message.

In 430, the access network device transmits a first message to a core network device.

In 440, the core network device receives the first message. The first message includes the uplink early data and the indication information. The indication information indicates whether the uplink early data is retransmission data.

In 450, the core network device determines whether the uplink early data is stored before the uplink early data is received, when the indication information indicates that the uplink early data is retransmission data.

In 460, the core network device reserves or discards the uplink early data base on a determination of whether the uplink early data is stored.

In a case where the uplink early data is transmitted through the control plane, the uplink early data in implementations of the present disclosure may be stored in the NAS information, the NAS information is encapsulated in the first MSG3, and the uplink early data is transmitted through the NAS information. In a case where the uplink early data is transmitted through a user plane, the first MSG3 and the uplink early data in implementations of the present disclosure may be transmitted through different channels after being multiplexed at a MAC layer and do not depend on the NAS information for data transmission.

In some implementations, the core network device per se may also have a detection function and do not depend on the indication of the indication information. For example, after receiving the uplink early data, the core network device may determine whether the uplink early data is stored before the uplink early data is received, so as to determine whether to reserve or discard the uplink early data based on a determination of whether the early data received is retransmission data.

In the data transmission method provided in implementations of the present disclosure, the first MSG3 transmitted by the terminal device to the access network device for accessing the first cell carries the indication information, and the indication information can indicate whether the uplink early data transmitted by the terminal device is retransmission data, so that the core network device can determine whether to reserve or discard the uplink early data. Therefore, according to the data transmission method provided in implementations of the present disclosure, an increase in signaling load caused by delivery failure of downlink early data or a need of CN paging to transmit the downlink early data due to cell reselection by the terminal device can be avoid. At the same time, resource waste caused by repeated reception of uplink early data due to cell reselection by the terminal device can be reduced. Therefore, reliability of early data transmission can be ensured.

Optionally, in some implementations, in a case where a serving cell of the terminal device is reselected from a second cell to the first cell and the terminal device has transmitted a second MSG3 for accessing the second cell and fails to receive a reply MSG4 for the second MSG3, the indication information indicates that the uplink early data is retransmission data.

The core network device determines whether the uplink early data is stored before the uplink early data is received according to the indication information.

The core network device discards the uplink early data based on a determination that the uplink early data is stored.

In implementations of the present disclosure, after receiving the indication information, the core network device determines whether the uplink early data is stored before the uplink early data is received according to the indication information, so as to reserve the uplink early data or discard one of the uplink early data repeatedly received.

Taking early data transmission through the control plane as an example, the terminal device transmits the second MSG3 to the access network device based on the second cell. The second MSG3 includes the uplink early data stored in the NAS information. Before receiving the reply MSG4 for the second MSG3, the terminal device performs cell reselection. The access network device may transmit the uplink early data stored on the NAS information to the core network device after receiving the second MSG3, so that the core network device can receive the uplink early data. Of course, the core network device may successfully receive the uplink early data, or may fail to receive the uplink early data for network reasons. However, the terminal device does not know whether the core network device has successfully received the uplink early data. In order to ensure normal data transmission, a random access procedure may be triggered again based on the first cell, to ensure the uplink early data to be successfully received by the core network device.

However, if the core network device has successfully received the uplink early data before, another reception of the uplink early data may be a repeated reception of the uplink early data, thereby resulting in resource waste. Therefore, the first MSG3 transmitted by the terminal device may carry indication information to indicate whether the uplink early data transmitted by the terminal device is retransmission data.

It should be understood that, the second MSG3 in implementations of the present disclosure may be a message transmitted by the terminal device to the access network device when the random access procedure is triggered for the first time, or may be a message transmitted by the terminal device to the access network device when the random access procedure is triggered after the cell reselection. The second MSG3 in implementations of the present disclosure may also carry the indication information to indicate whether the uplink early data is duplicate data.

The uplink early data in implementations of the present disclosure may be stored in the NAS information. The NAS information is encapsulated in the first MSG3 or the second MSG3, or may also be stored in a dedicated physical channel and transmitted to the access network device together with the first MSG3 or the second MSG3 after being multiplexed at the MAC layer.

The above introduces a case where the uplink early data is transmitted again after the serving cell of the terminal device is reselected from the second cell to the first cell, and the core network device determines that the uplink early data is already stored. Of course, in some cases, the terminal device transmits the uplink early data again after reselecting from the second cell to the first cell, and the core network device may determine that no uplink early data is not stored before the uplink early data is received. The following introduces a case where the core network device stores no uplink early data.

Optionally, in some implementations, the core network device reserves the uplink early data based on a determination that no uplink early data is stored before the uplink early data is received.

In implementations of the present disclosure, in some cases, if the terminal device transmits the second MSG3 to the access network device and fails to receive the reply MSG4 for the second MSG3, the uplink early data transmitted by the terminal device may be received by the core network device. However, in some cases, the core network device may fail to receive the uplink early data for network reasons. Therefore, when receiving the indication information indicating that the uplink early data is retransmission data, the core network device may determine whether the uplink early data is stored before the uplink early data is received, and reserve the uplink early data received based on a determination that no uplink early data is stored before the uplink early data is received.

The above introduces specific operations performed by the core network device when the indication information, which is transmitted by the terminal device after the serving cell of the terminal device is reselected from the second cell to the first cell, indicates that the uplink early data is retransmission data. Of course, in some cases, the indication information, which is transmitted after the serving cell of the terminal device is reselected from the second cell to the first cell, indicates that the uplink early data is not retransmission data, which will be introduced below.

Optionally, in some implementations, in a case where a serving cell of the terminal device is reselected from a second cell to the first cell and the terminal device has transmitted a second MSG3 for accessing the second cell and receives a reply MSG4 for the second MSG3, the indication information indicates that the uplink early data is not retransmission data.

The core network device reserves the uplink early data according to the indication information.

In implementations of the present disclosure, if the terminal device has transmitted the second MSG3 to the access network device based on the second cell and has received the reply MSG4 for the second MSG3, and the serving cell of the terminal device is reselected from the second cell to the first cell, when the terminal device transmits an uplink message to the access network device, the indication information in the first MSG3 can indicate whether the uplink early data is retransmission data. After receiving the indication information, the core network device may reserve the uplink early data because the indication information indicates that the uplink early data is not retransmission data.

As mentioned above, when the uplink early data is transmitted through the control plane, the uplink early data transmitted by the terminal device is transmitted through dedicated NAS information. The NAS information is encapsulated in an RRC early data request message. When the serving cell of the terminal device is reselected from the second cell to the first cell, and the terminal device has transmitted the second MSG3 and has not received the MSG4, the terminal device may reset the MAC layer and notify the NAS that this RRC connection establishment fails. However, in this transmission scheme, the uplink early data can be transmitted directly.

Optionally, in some implementations, in a case where the uplink early data is transmitted through a control plane, the uplink early data is obtained by the terminal device at an AS from a MSG3 buffer.

The MSG3 buffer in implementations of the present disclosure may be for the case of control plane transmission.

When the uplink early data is transmitted through the control plane, the uplink early data is stored in the dedicated NAS information, and the NAS information is encapsulated in a MSG3. Therefore, during data transmission, there may be a MSG3 buffer, so that when a random access procedure fails and is triggered again, the uplink early data can be obtained from the MSG3 buffer, and there is no need to obtain the uplink early data from the NAS information.

In the data transmission method provided in implementations of the present disclosure, since the uplink early data stored in the NAS information and included in the first MSG3, which is transmitted by the AS of the terminal device when a random access procedure is re-triggered, is obtained from the MSG3 buffer, consumption of network traffic can be reduced.

Optionally, in some implementations, in a case where a serving cell of the terminal device is reselected from a second cell to the first cell, at the AS, the terminal device maintains a MAC configuration of the second cell, and skips notifying an NAS that the serving cell of the terminal device is reselected from the second cell to the first cell.

In implementations of the present disclosure, when the uplink early data is transmitted through the control plane, if the terminal device has transmitted to the access network device the second MSG3 for accessing the second cell and fails to receive the reply MSG4 for the second MSG3, and the serving cell of the terminal device is reselected from the second cell to the first cell, the AS of the terminal device may not reset the MAC, maintain the MAC layer and the configuration thereof, and skip notifying the NAS that the serving cell of the terminal device is reselected from the second cell to the first cell. After the cell reselection, the terminal device obtains system broadcast information of the first cell, and the AS of the terminal device triggers a random access procedure again. During this random access procedure, the terminal device may obtain the uplink early data from the MSG3 buffer.

As introduced above, when the uplink early data is transmitted through the control plane, if the serving cell of the terminal device is reselected from the second cell to the first cell, and the terminal device has transmitted the second MSG3 for accessing the second cell and fails to receive the reply MSG4 for the second MSG3, the MAC may not be reset, the NAS may not be notified that the serving cell of the terminal device is reselected from the second cell to the first cell, and the uplink early data may be obtained from the MSG3 buffer. In a case where the uplink early data is transmitted through the user plane, the terminal device may notify the NAS that the serving cell of the terminal device is reselected from the second cell to the first cell, or may not notify the NAS that the serving cell of the terminal device is reselected from the second cell to the first cell.

It will be understood that, during uplink early data transmission through the user plane, the uplink early data is transmitted through a dedicated physical channel, which has nothing to do with NAS. Therefore, for the scheme of uplink early data transmission through the user plane, the AS of the terminal device may notify the NAS that the serving cell of the terminal device is reselected from the second cell to the first cell, or may not notify the NAS that the serving cell of the terminal device is reselected from the second cell to the first cell.

Optionally, in some implementations, in a case where the uplink early data is transmitted through a user plane, an AS of the terminal device notifies an NAS that a serving cell of the terminal device is reselected from a second cell to the first cell.

In implementations of the present disclosure, when the uplink early data is transmitted through the user plane, if the serving cell of the terminal device is reselected from the second cell to the first cell, and the terminal device has transmitted the second MSG3 for accessing the second cell and fails to receive the reply MSG4 for the second MSG3, the AS of the terminal device may notify the NAS that the serving cell of the terminal device is reselected from the second cell to the first cell and wait for an indication from the NAS.

If the NAS indicates to further transmit the uplink early data, the NAS triggers the AS to perform a random access procedure again. If the NAS indicates not to transmit the uplink early data, the NAS no longer triggers the AS.

Figure 5:
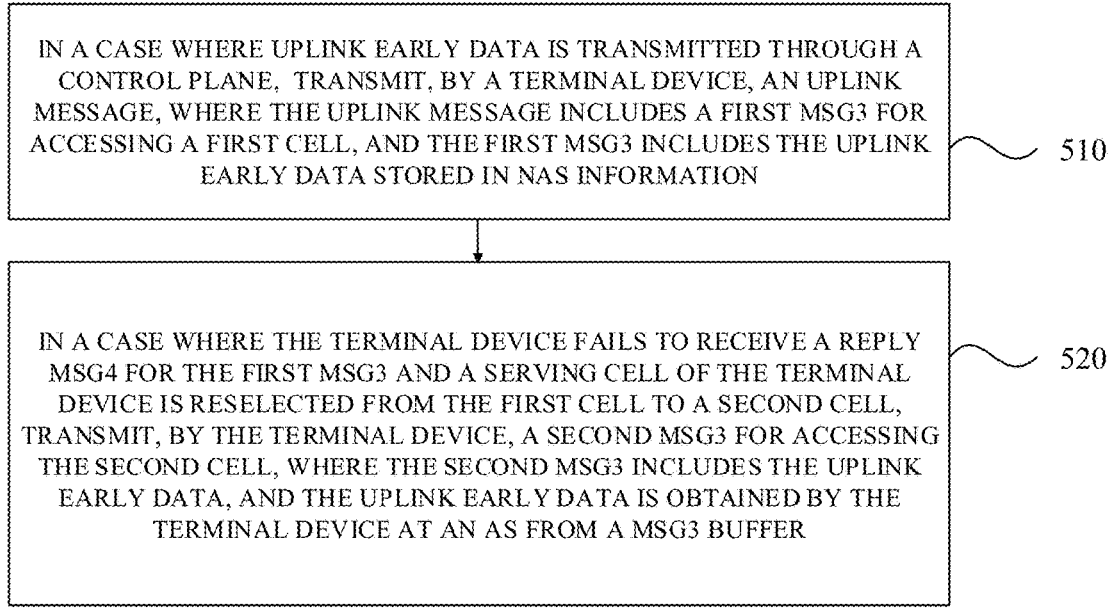
FIG. 5 is another schematic flowchart of a data transmission method provided in an implementation of the present disclosure.

Optionally, in some implementations, as illustrated in FIG. 5, FIG. 5 illustrates a data transmission method 500 according to an implementation of the present disclosure, and the method 500 may include operations 510 to 520.

In 510, in a case where uplink early data is transmitted through a control plane, a terminal device transmits an uplink message, where the uplink message includes a first MSG3 for accessing a first cell, and the first MSG3 includes the uplink early data stored in NAS information.

In 520, in a case where the terminal device fails to receive a reply MSG4 for the first MSG3 and a serving cell of the terminal device is reselected from the first cell to a second cell, the terminal device transmits a second MSG3 for accessing the second cell, where the second MSG3 includes the uplink early data, and the uplink early data is obtained by the terminal device at an AS from a MSG3 buffer.

In implementations of the present disclosure, when the uplink early data is transmitted through the control plane, if the serving cell of the terminal device is reselected from the first cell to the second cell, and the terminal device has transmitted the second MSG3 for accessing the second cell and fails to receive the reply MSG4 for the second MSG3, after the cell reselection, the terminal device may obtain system broadcast information of the second cell, and the AS of the terminal device triggers a random access procedure again and transmits to the access network device the second MSG3 for accessing the second cell. During this random access procedure, the uplink early data transmitted by the terminal device may be obtained from the MSG3 buffer.

In the data transmission method provided in implementations of the present disclosure, since the uplink early data included in the second MSG3, which is transmitted by the AS of the terminal device when a random access procedure is re-triggered, is obtained from the MSG3 buffer, consumption of network traffic can be reduced.

Optionally, in some implementations, as illustrated in FIG. 6, the method 500 may further include an operation 530.

In 530, in a case where the serving cell of the terminal device is reselected from the first cell to the second cell, at the AS, the terminal device maintains a MAC configuration of the first cell, and skips notifying an NAS that the serving cell of the terminal device is reselected from the first cell to the second cell.

In implementations of the present disclosure, when the uplink early data is transmitted through the control plane, if the serving cell of the terminal device is reselected from the first cell to the second cell, and the terminal device has transmitted the second MSG3 for accessing the second cell and fails to receive the reply MSG4 for the second MSG3, the AS of the terminal device may not reset the MAC, maintain the MAC layer and the configuration thereof, and skip notifying the NAS that the serving cell of the terminal device is reselected from the first cell to the second cell. After the cell reselection for the serving cell of the terminal device, the terminal device may obtain system broadcast information of the second cell, and the AS of the terminal device triggers a random access procedure again. During this random access procedure, the terminal device may obtain the uplink early data from the MSG3 buffer.

As illustrated above, during early data transmission, the first MSG3 transmitted by the terminal device may carry indication information indicating whether the uplink early data transmitted by the terminal device is retransmission data, so that the core network device may reserve or discard the uplink early data received according to the indication information. In some cases, the first MSG3 transmitted by the terminal device may not carry the indication information, and reliability of early data transmission may also be ensured.

Figure 7:
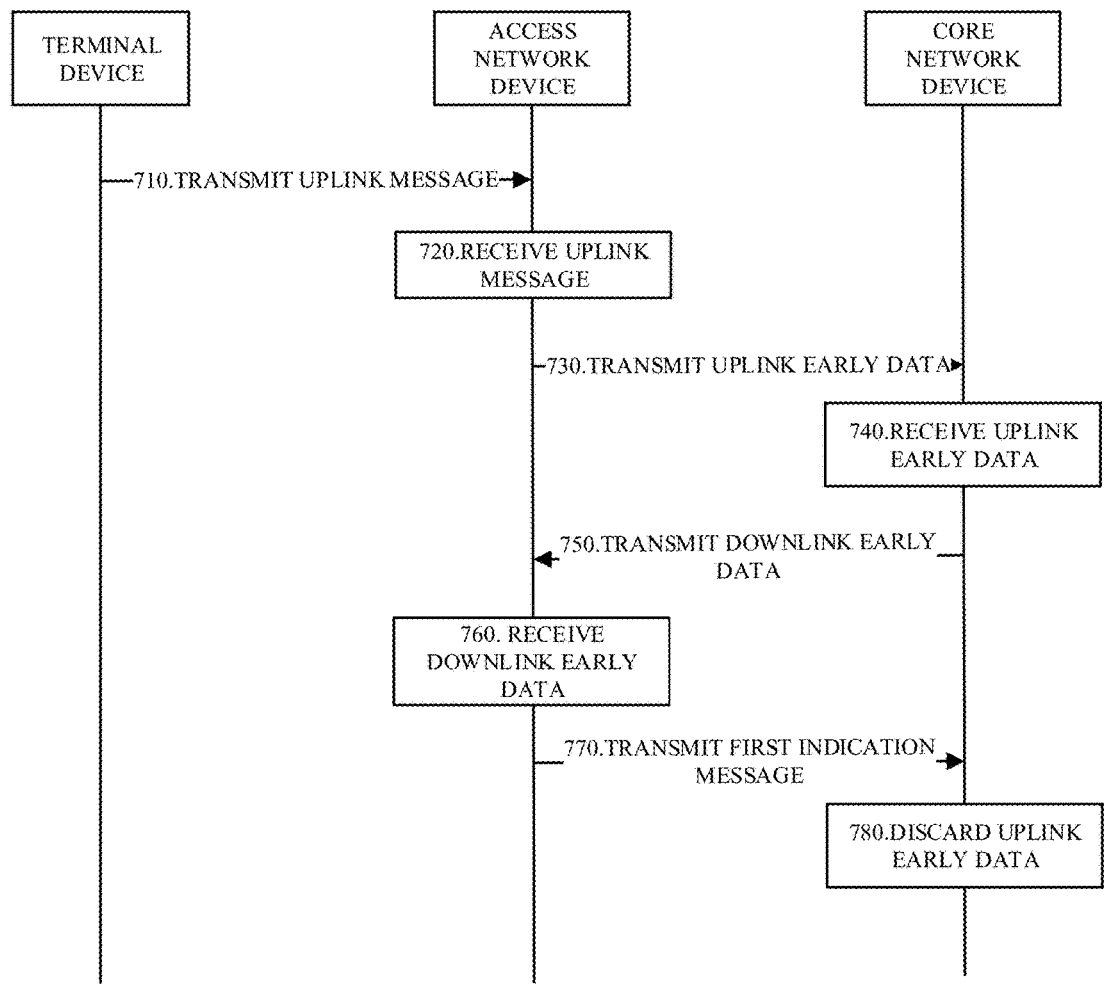
FIG. 7 is another schematic flowchart of a data transmission method provided in an implementation of the present disclosure.

Optionally, in some implementations, as illustrated in FIG. 7, FIG. 7 illustrates a data transmission method 700 according to an implementation of the present disclosure, and the method 700 may include operations 710 to 780.

In 710, a terminal device transmits an uplink message.

In 720, an access network device receives the uplink message transmitted by the terminal device during random access, where the uplink message includes a MSG3 for accessing a first cell, and the MSG3 includes uplink early data stored in NAS information, or the uplink message includes the MSG3 for accessing the first cell and the uplink early data.

In 730, the access network device transmits the uplink early data to a core network device.

In 740, the core network device receives the uplink early data transmitted by the access network device.

In 750, the core network device transmits downlink early data to the access network device.

In 760, the access network device receives the downlink early data transmitted from the core network device.

In 770, the access network device transmits first indication information to the core network device in a case where a MSG4 is determined not to be successfully transmitted, where the first indication information indicates that the core network device discards the uplink early data, and the MSG4 is a reply message for the MSG3.

In 780, the core network device discards the uplink early data.

In implementations of the present disclosure, after receiving the uplink message transmitted by the terminal device, the access network device may transmit the uplink early data included in the uplink message to the core network device. After receiving the uplink early data transmitted by the access network device, the core network device transmits the downlink early data to the access network device. In a case where the MSG4 is determined not to be successfully transmitted, the access network device transmits the first indication information to the core network device to indicate that the core network device discards the uplink early data. After the core network device discards the uplink early data, the terminal device triggers a random access procedure again on the reselected cell, so that the core network device can correctly receive the uplink early data, and the terminal device can correctly receive the downlink early data, thereby ensuring reliability of early data transmission.

In implementations of the present disclosure, in a case where the MSG4 is determined not to be successfully transmitted, delivery failure of the MSG4 transmitted by the access network device may occur due to the reselection of the serving cell of the terminal device, which may cause the terminal device to fail to receive the MSG4, or the access network device may have transmitted the MSG4, but the terminal device fails to receive the MSG4 due to the reselection of the serving cell of the terminal device.

In the data transmission method provided in implementations of the present disclosure, in a case where the MSG4 is determined not to be successfully transmitted, the access network device indicates that the core network device discards the uplink early data transmitted by the terminal device. Therefore, according to the data transmission method provided in implementations of the present disclosure, an increase in signaling load caused by delivery failure of downlink early data or a need of paging by the core network device to transmit the early data can be avoided. In addition, resource waste caused by repeated reception of uplink early data due to cell reselection by the terminal device can be avoided. Therefore, reliability of early data transmission can be ensured.

Figure 8:
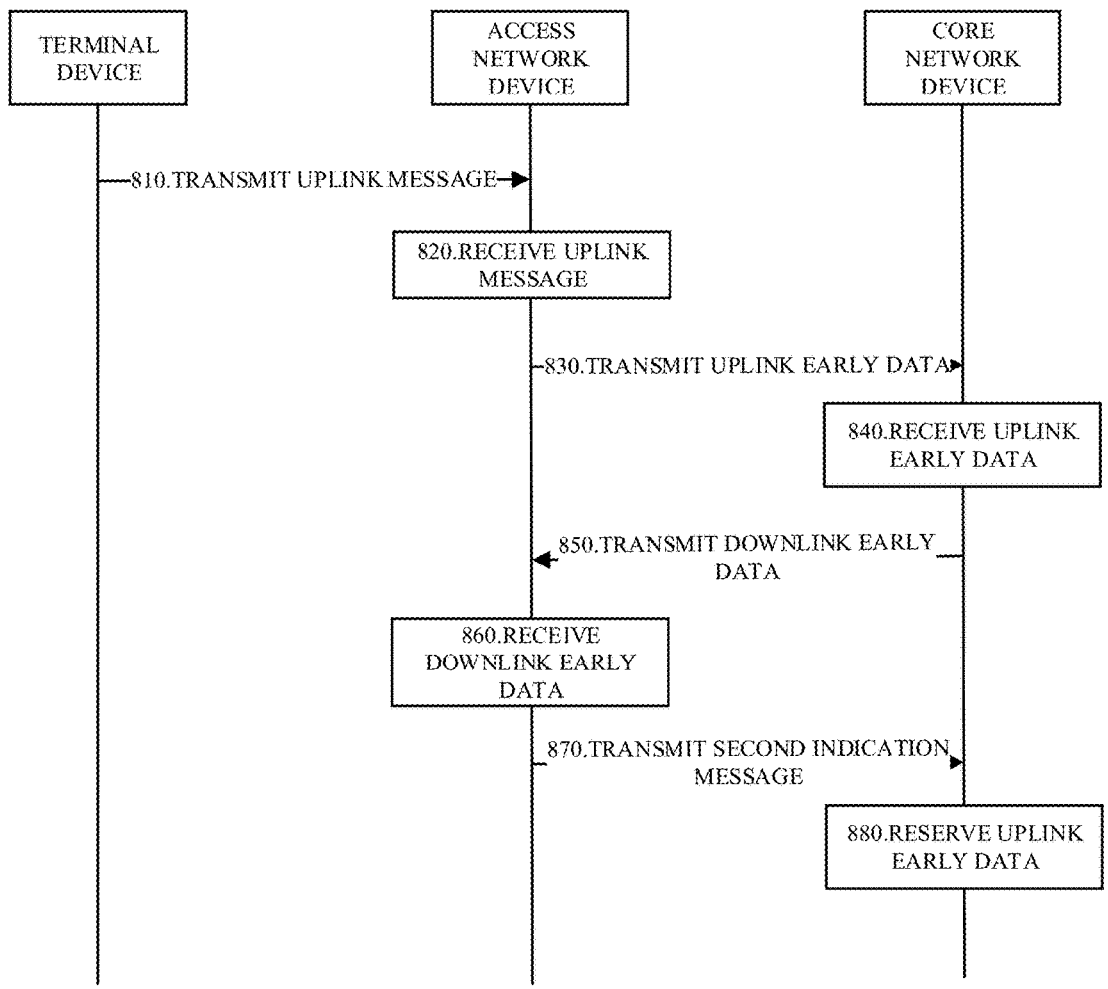
FIG. 8 is another schematic flowchart of a data transmission method provided in an implementation of the present disclosure.

Optionally, in some implementations, as illustrated in FIG. 8, FIG. 8 illustrates a data transmission method 800 according to an implementation of the present disclosure, and the method 800 may include operations 810 to 880.

In 810, a terminal device transmits an uplink message.

In 820, an access network device receives an uplink message transmitted by a terminal device during random access, where the uplink message includes a MSG3 for accessing a first cell, and the MSG3 includes uplink early data stored in NAS information, or the uplink message includes the MSG3 for accessing the first cell and the uplink early data.

In 830, the access network device transmits the uplink early data to a core network device.

In 840, the core network device receives the uplink early data transmitted by the access network device.

In 850, the core network device transmits downlink early data to the access network device.

In 860, the access network device receives the downlink early data transmitted from the core network device.

In 870, in a case where the MSG4 is determined to be successfully transmitted, the access network device transmits second indication information to the core network device, where the second indication information indicates that the core network device reserves the uplink early data.

In 880, the core network device reserves the uplink early data.

In implementations of the present disclosure, after receiving the uplink message transmitted by the terminal device, the access network device may transmit the uplink early data included in the uplink message to the core network device. After receiving the uplink early data transmitted by the access network device, the core network device transmits the downlink early data to the access network device. In a case where the terminal device is determined to successfully receive the MSG4, the access network device transmits the second indication information to the core network device to indicates that the core network device reserves the uplink early data.

As illustrated above, the access network device determines whether the MSG4 is successfully transmitted and indicates that the core network device reserves or discards the uplink early data received, thereby ensuring reliability of early data transmission. Of course, in some cases, after receiving the MSG3, the access network device may first determine whether the terminal device has received the MSG4 correctly, and then determine whether to forward to the core network device the uplink early data transmitted by the terminal device.

Figures 9, 10:
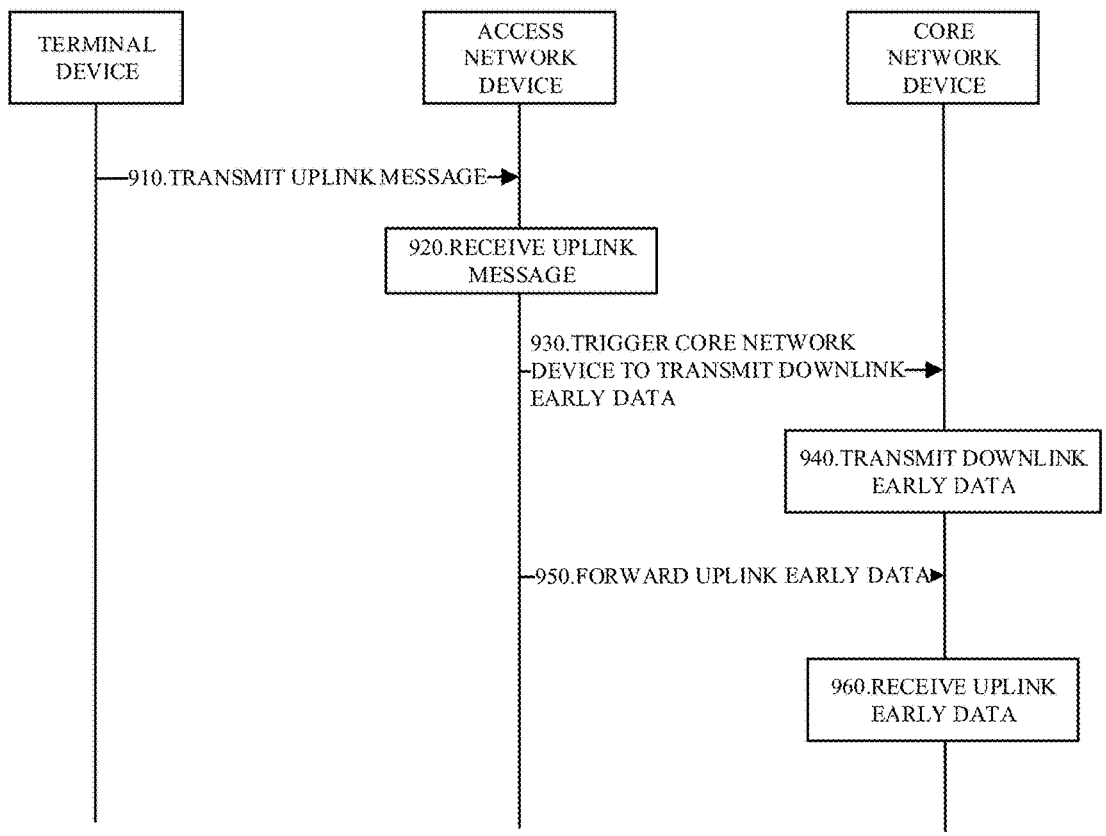
FIG. 9 is another schematic flowchart of a data transmission method provided in an implementation of the present disclosure.
FIG. 10 is another schematic flowchart of a data transmission method provided in an implementation of the present disclosure.

Optionally, in some implementations, as illustrated in FIG. 9, FIG. 9 illustrates a data transmission method 900 according to an implementation of the present disclosure, and the method 900 may include operations 910 to 960.

In 910, a terminal device transmits an uplink message.

In 920, an access network device receives the uplink message transmitted by the terminal device during random access, where the uplink message includes a MSG3 for accessing a first cell, and the MSG3 includes uplink early data stored in NAS information, or the uplink message includes the MSG3 for accessing the first cell and the uplink early data.

In 930, the access network device triggers a core network device to transmit downlink early data.

In 940, the core network device transmits the downlink early data carried in a downlink message, where the downlink message also carries a MSG4.

In 950, the access network device forwards the uplink early data to the core network device in a case where the terminal device is determined to successfully receive the downlink message, where the downlink message carries a reply MSG4 for the MSG3.

In 960, the core network device receives the uplink early data carried in the MSG3 and forwarded by the access network device.

In implementations of the present disclosure, after receiving the uplink message transmitted by the terminal device, the access network device may temporarily not forward the uplink early data included in the uplink message to the core network device, and the access network device may first trigger the core network device to transmit the downlink early data. When the terminal device is determined to successfully receive the MSG4, the access network device forwards the uplink early data received to the core network device, and the core network device then receives the uplink early data.

In the data transmission method provided in implementations of the present disclosure, after receiving the MSG3, the access network device triggers the core network device to transmit the downlink early data. After the MSG4 as a reply for the MSG3 is determined to be received at the terminal device, the access network device forwards the uplink early data to the core network device. In this way, the following situation can be avoided: the core network device has received the uplink early data and may discard the received uplink early data once determining that the terminal device fails to receive the MSG4 correctly. Therefore, network traffic can be saved.

Optionally, in some implementations, the access network device discards the uplink early data in a case where the terminal device is determined to fail to receive the downlink message.

In implementations of the present disclosure, when determining that the terminal device fails to receive the reply MSG4 for the MSG3, the access network device may discard the uplink early data received. In this way, the following situation can be avoided: the core network device has received the uplink early data and may discard the received uplink early data once determining that the terminal device fails to receive the MSG4 correctly. Therefore, reliability of early data transmission can be ensured and network traffic can also be saved.

In order to ensure reliability of early data transmission, as illustrated above, indication information may be added into the MSG3 to indicate whether the uplink early data is retransmission data, so that the core network device can determine whether to reserve or discard the uplink early data according to the indication information. Alternatively, the network access device may first determine whether the terminal device has correctly received the MSG4, and then indicate that the core network device reserves or discards the uplink early data. In some implementations, in order to ensure reliability of early data transmission, reselection of the serving cell of the terminal device may be avoided as much as possible.

Optionally, in some implementations, as illustrated in FIG. 10, FIG. 10 illustrates a data transmission method 1000 according to an implementation of the application, and the method may include an operation 1010.

In 1010, during EDT, a terminal device restricts the terminal device from performing cell reselection until the EDT is completed.

In implementations of the present disclosure, during EDT, the terminal device may restrict the terminal device from reselecting a serving cell until the EDT is completed. For example, if a current serving cell of the terminal device is the first cell, and early data transmission is triggered in the first cell, during the entire early data transmission, the terminal device may not reselect another cell, and complete the early data transmission by regarding the first cell in which the terminal device resides when the early data transmission is triggered functions as the serving cell.

In the data transmission method provided in implementations of the present disclosure, during early data transmission, the terminal device restricts the terminal device from reselecting a serving cell. Since the serving cell of the terminal device remains unchanged, correct reception of the downlink early data delivered by the core network device can be ensured. The following situation can also be avoided: due to uncertainty of whether the uplink early data is received at the core network device, if the uplink early data is repeatedly transmitted after the serving cell of the terminal device is reselected, it may lead to repeated reception of the uplink early data at the core network device. Therefore, reliability of early data transmission can be ensured.

Optionally, in some implementations, the method further includes the following. The terminal device sets a cell in which the terminal device resides when the EDT is triggered as a cell with a highest priority. The terminal device restricts the terminal device from performing cell reselection as follows until the EDT is completed. The terminal device completes the EDT based on the cell with the highest priority.

In implementations of the present disclosure, the terminal device may set the cell in which the terminal device resides when the early data transmission is triggered as the cell with the highest priority, and the terminal device completes the early data transmission based on the cell.

Method implementations of the present disclosure are described in detail above with reference to FIGS. 1 to 10, and apparatus implementations of the present disclosure are described below with reference to FIGS. 11 to 21. The apparatus implementations correspond to the method implementations. Therefore, parts of the apparatus implementations not described in detail may refer to corresponding parts of the method implementations.

Figure 11:
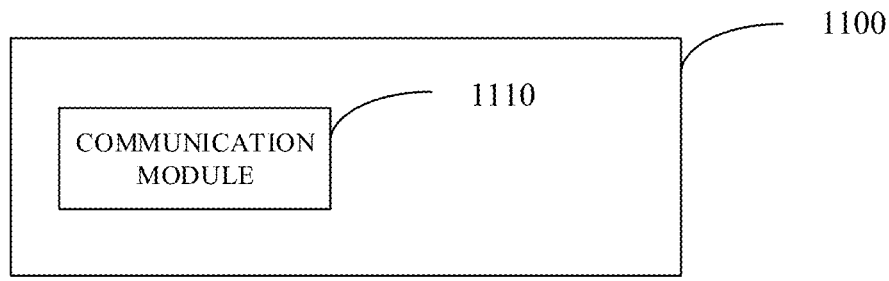
FIG. 11 is a schematic structural diagram of a data transmission apparatus provided in an implementation of the present disclosure.

FIG. 11 illustrates a wireless communication apparatus 1100 provided in an implementation of the present disclosure. The wireless communication apparatus 1100 may include a communication module 1110.

The communication module 1110 is configured to transmit an uplink message, where the uplink message includes a first MSG3 for accessing a first cell, and the first MSG3 includes uplink early data stored in NAS information, or the uplink message includes the first MSG3 for accessing the first cell and the uplink early data. The first MSG3 carries indication information, and the indication information indicates whether the uplink early data is retransmission data.

Optionally, in some implementations, in a case where a serving cell of a terminal device is reselected from a second cell to the first cell and the terminal device has transmitted a second MSG3 for accessing the second cell and fails to receive a reply MSG4 for the second MSG3, the indication information indicates that the uplink early data is retransmission data.

Optionally, in some implementations, in a case where a serving cell of a terminal device is reselected from a second cell to the first cell and the terminal device has transmitted a second MSG3 for accessing the second cell and receives a reply MSG4 for the second MSG3, the indication information indicates that the uplink early data is not retransmission data.

Optionally, in some implementations, in a case where the uplink early data is transmitted through a control plane, the uplink early data is obtained by a terminal device at an AS from a MSG3 buffer.

Optionally, in some implementations, the apparatus further includes a processing module. The processing module is configured to: in a case where a serving cell of the terminal device is reselected from a second cell to the first cell, at the AS, maintain a MAC configuration of the second cell, and skip notifying an NAS that the serving cell of the terminal device is reselected from the second cell to the first cell.

Optionally, in some implementations, the processing module 1120 is further configured to: in a case where the uplink early data is transmitted through a user plane, notify an NAS that a serving cell of a terminal device is reselected from a second cell to the first cell.

Figure 12:
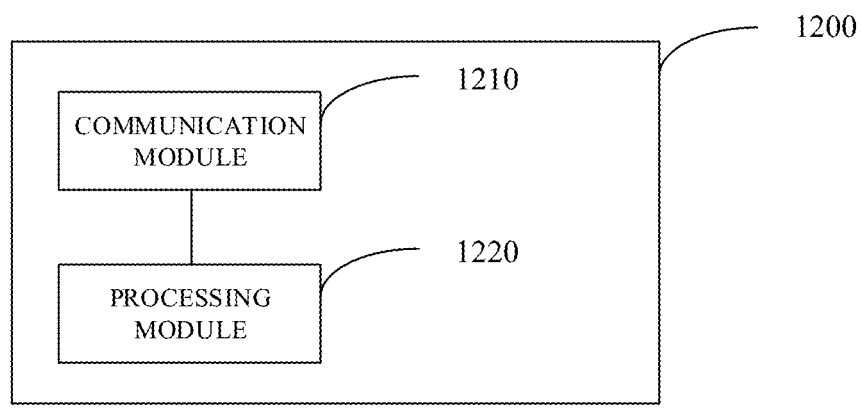
FIG. 12 is another schematic structural diagram of a data transmission apparatus provided in an implementation of the present disclosure.

FIG. 12 illustrates a wireless communication apparatus 1200 provided in an implementation of the present disclosure. The wireless communication apparatus 1200 may include a communication module 1210 and a processing module 1220.

The communication module 1210 is configured to receive a first message, where the first message includes uplink early data and indication information, the indication information indicates whether the uplink early data is retransmission data. The processing module 1220 is configured to determine, by a core network device, whether the uplink early data is stored before the uplink early data is received, when the indication information indicates that the uplink early data is retransmission data. The processing module is further configured to reserve or discard the uplink early data based on a determination of whether the uplink early data is stored.

Optionally, in some implementations, the processing module 1220 is further configured to: discard, by the core network device, the uplink early data based on a determination that the uplink early data is stored before the uplink early data is received.

Optionally, in some implementations, the processing module 1220 is further configured to: reserve, by the core network device, the uplink early data based on a determination that no uplink early data is stored before the uplink early data is received.

Optionally, in some implementations, the processing module 1220 is further configured to: reserve the uplink early data when the indication information indicates that the uplink early data is not retransmission data.

Figure 13:
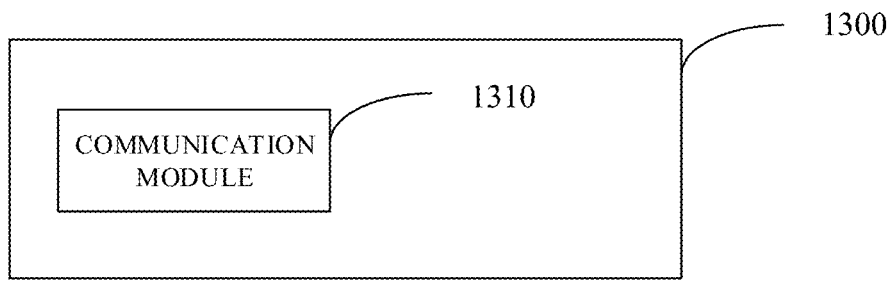
FIG. 13 is another schematic structural diagram of a data transmission apparatus provided in an implementation of the present disclosure.

FIG. 13 illustrates a wireless communication apparatus 1300 provided in an implementation of the present disclosure. The wireless communication apparatus 1300 may include a communication module 1310.

The communication module 1310 is configured to: in a case where uplink early data is transmitted through a control plane, transmit an uplink message, where the uplink message includes a first MSG3 for accessing a first cell, and the first MSG3 includes the uplink early data stored in NAS information. The communication module 1310 is further configured to: in a case where a terminal device is determined to fail to receive a reply MSG4 for the first MSG3 and a serving cell of the terminal device is reselected from the first cell to a second cell, transmit a second MSG3 for accessing the second cell, where the second MSG3 includes the uplink early data, and the uplink early data is obtained by the terminal device at an AS from a MSG3 buffer.

Optionally, in some implementations, the apparatus 1300 further includes a processing module. The processing module is configured to: in a case where the serving cell of the terminal device is reselected from the first cell to the second cell, at the AS, maintain a MAC configuration of the first cell, and skip notifying an NAS that the serving cell of the terminal device is reselected from the first cell to the second cell.

Figure 14:
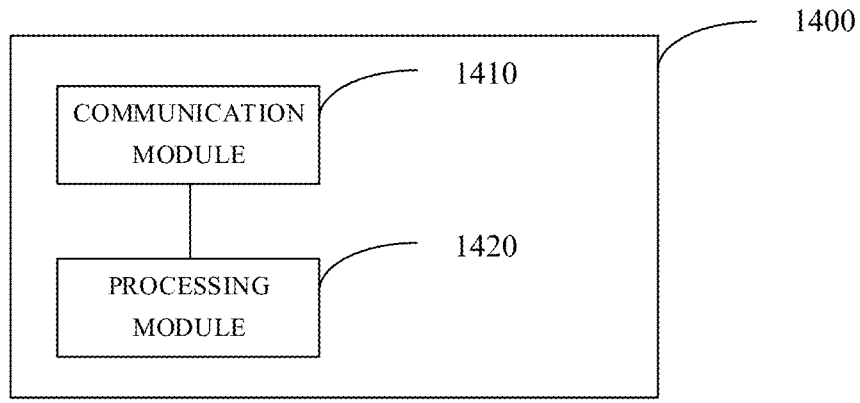
FIG. 14 is another schematic structural diagram of a data transmission apparatus provided in an implementation of the present disclosure.

FIG. 14 illustrates a wireless communication apparatus 1400 provided in an implementation of the present disclosure. The wireless communication apparatus 1400 may include a communication module 1410 and a processing module 1420.

The communication module 1410 is configured to receive an uplink message transmitted by a terminal device during random access, where the uplink message includes a MSG3 for accessing a first cell, and the MSG3 includes uplink early data stored in NAS information, or the uplink message includes the MSG3 for accessing the first cell and the uplink early data. The communication module 1410 is further configured to transmit the uplink early data to a core network device. The communication module 1410 is further configured to receive downlink early data transmitted from the core network device. The apparatus 1400 further includes the communication module 1410. The communication module 1410 is configured to: transmit first indication information to the core network device in a case where a MSG4 is determined not to be successfully transmitted, where the first indication information indicates that the core network device discards the uplink early data, and the MSG4 is a reply message for the MSG3.

Optionally, in some implementations, the processing module 1420 is further configured to: in a case where the MSG4 is determined to be successfully transmitted, transmit second indication information to the core network device, where the second indication information indicates that the core network device reserves the uplink early data.

Figure 15:
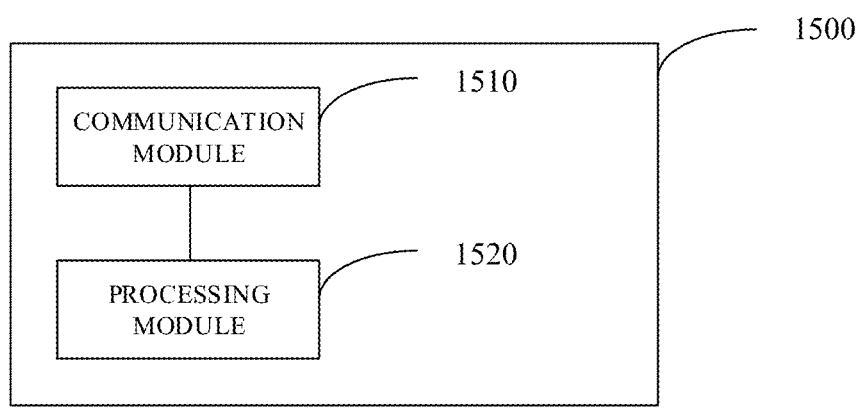
FIG. 15 is another schematic structural diagram of a data transmission apparatus provided in an implementation of the present disclosure.

FIG. 15 illustrates a wireless communication apparatus 1500 provided in an implementation of the present disclosure. The wireless communication apparatus 1500 may include a communication module 1510 and a processing module 1520.

The communication module 1510 is configured to receive uplink early data transmitted by an access network device. The communication module 1510 is further configured to transmit downlink early data to the access network device. The apparatus 1500 further includes the processing module 1520. The processing module 1520 is configured to discard the uplink early data according to first indication information received by a core network device when the first indication information indicates that the core network device discards the uplink early data.

Optionally, in some implementations, the processing module 1520 is further configured to: reserve the uplink early data according to second indication information received by the core network device when the second indication information indicates that the core network device reserves the uplink early data.

Figure 16:
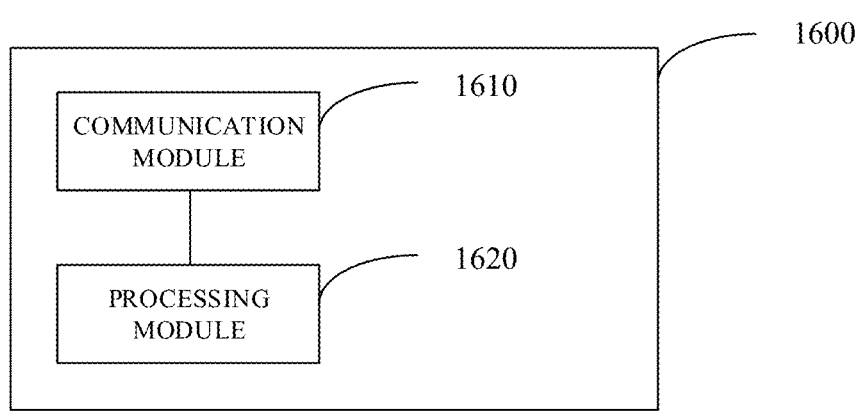
FIG. 16 is another schematic structural diagram of a data transmission apparatus provided in an implementation of the present disclosure.

FIG. 16 illustrates a wireless communication apparatus 1600 provided in an implementation of the present disclosure. The wireless communication apparatus 1600 may include a communication module 1610 and a processing module 1620.

The communication module 1610 is configured to: receive an uplink message transmitted by a terminal device during random access, where the uplink message includes a MSG3 for accessing a first cell, and the MSG3 includes uplink early data stored in NAS information, or the uplink message includes the MSG3 for accessing the first cell and the uplink early data. The processing module 1620 is configured to trigger a core network device to transmit downlink early data. The processing module 1620 is further configured to forward the uplink early data to the core network device in a case where the terminal device is determined to successfully receive a downlink message, where the downlink message carries a reply MSG4 for the MSG3.

Optionally, in some implementations, the processing module 1620 is further configured to discard the uplink early data in a case where the terminal device is determined to fail to receive the downlink message.

Figure 17:
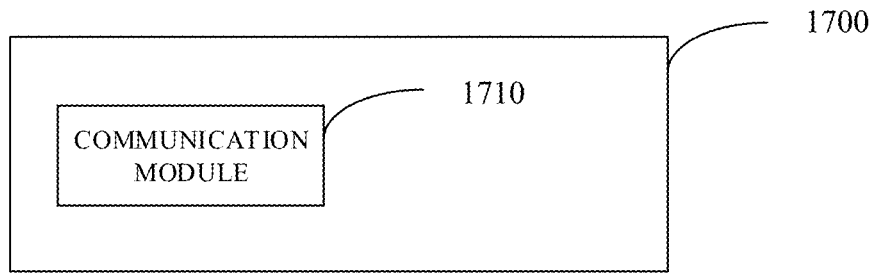
FIG. 17 is another schematic structural diagram of a data transmission apparatus provided in an implementation of the present disclosure.

FIG. 17 illustrates a wireless communication apparatus 1700 provided in an implementation of the present disclosure. The wireless communication apparatus 1700 may include a communication module 1710.

The communication module 1710 is configured to receive indication information, where the indication information indicates that a core network device transmits downlink early data. The communication module 1710 is further configured to transmit the downlink early data carried in a downlink message. The communication module 1710 is further configured to receive uplink early data forwarded by an access network device.

Figure 18:
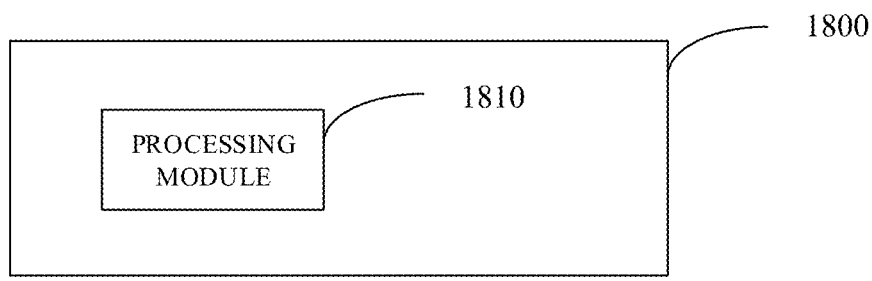
FIG. 18 is another schematic structural diagram of a data transmission apparatus provided in an implementation of the present disclosure.

FIG. 18 illustrates a wireless communication apparatus 1800 provided in an implementation of the present disclosure. The wireless communication apparatus 1800 may include a processing module 1810.

The processing module 1810 is configured to: during EDT, restrict a terminal device from performing cell reselection until the EDT is completed.

Optionally, in some implementations, the processing module 1810 is further configured to: set, by the terminal device, a cell in which the terminal device resides when the EDT is triggered as a cell with a highest priority. The processing module 1810 is further configured to complete the EDT based on the cell with the highest priority.

Figure 19:
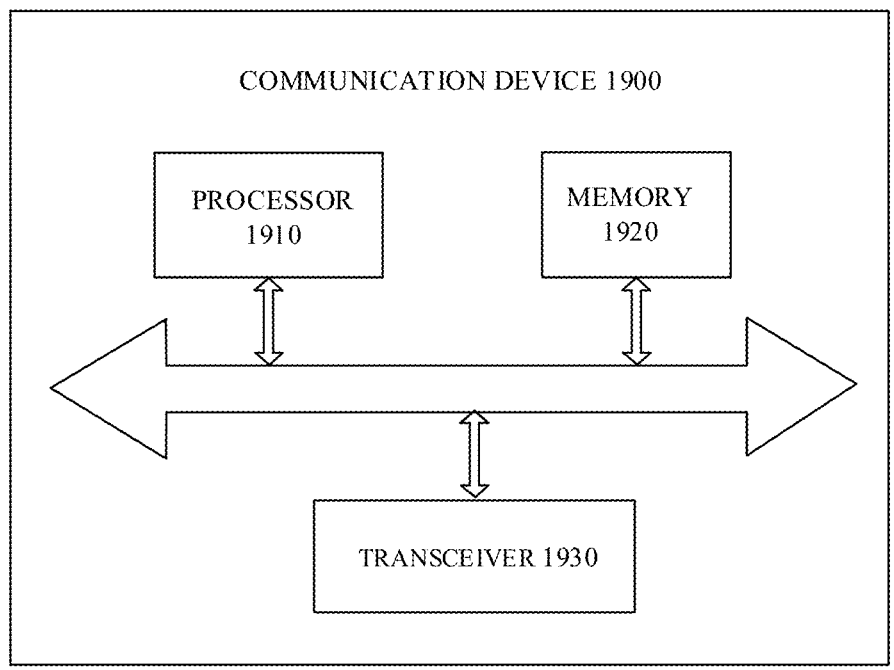
FIG. 19 is a schematic structural diagram of a communication device provided in an implementation of the present disclosure.

A communication device 1900 is also provided in implementations of the present disclosure. As illustrated in FIG. 19, the communication device 1900 includes a processor 1910 and a memory 1920. The memory is configured to store computer programs. The processor is configured to invoke and execute the computer programs stored in the memory to perform the method in implementations of the present disclosure.

The processor 1910 may invoke and execute the computer programs stored in the memory 1920 to perform the method in implementations of the present disclosure.

The memory 1920 may be a separate device independent of the processor 1910, or may be integrated into the processor 1910.

Optionally, as illustrated in FIG. 19, the communication device 1900 can further include a transceiver 1930. The processor 1910 can control the transceiver 1930 to communicate with other devices, for example, to send information or data to other devices, or to receive information or data from other devices.

The transceiver 1930 may include a transmitter and a receiver. The transceiver 1930 may further include an antenna, where one or more antenna can be provided.

Optionally, the communication device 1900 may be operable as the access network device in implementations of the present disclosure, and the communication device 1900 can implement the operations performed by the access network device described in the foregoing method implementations of the present disclosure, which will not be repeated herein for the sake of simplicity.

Optionally, the communication device 1900 may be operable as the mobile terminal/the terminal device in implementations of the present disclosure, and the communication device 1900 can implement the operations performed by the mobile terminal/the terminal device described in the foregoing method implementations, which will not be repeated herein for the sake of simplicity.

Figure 20:
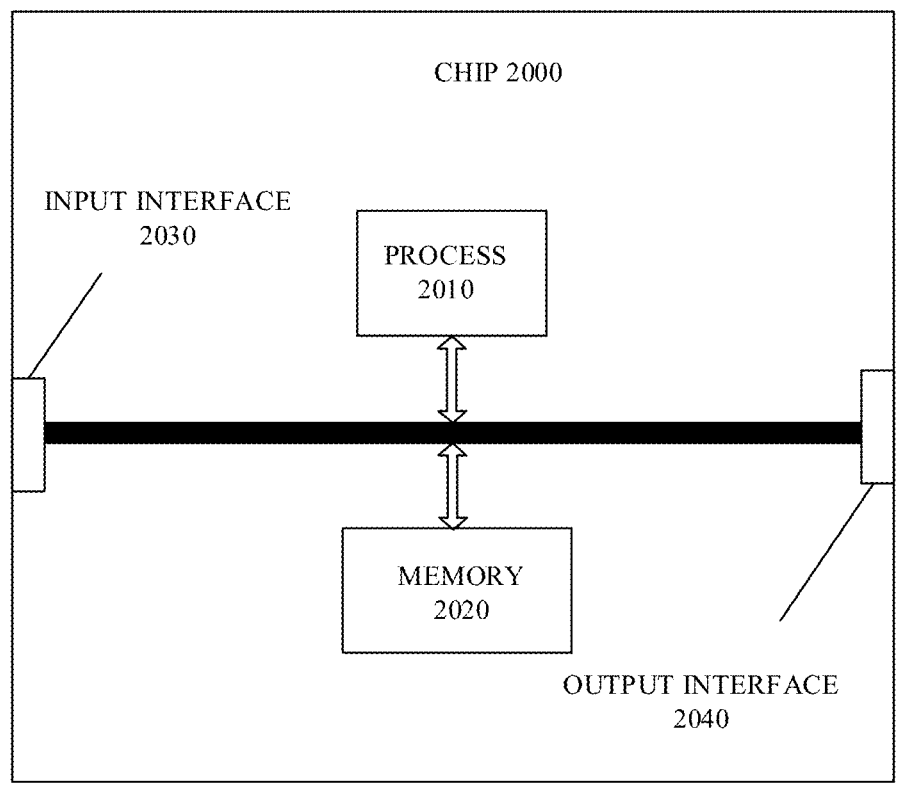
FIG. 20 is a schematic structural diagram of a chip provided in an implementation of the present disclosure.

FIG. 20 is a schematic structural diagram of a chip according to an implementation of the present disclosure. As illustrated in FIG. 20, the chip 2000 includes a processor 2010. The processor 2010 is configured to invoke and execute computer programs stored in a memory to perform the method in implementations of the present disclosure.

Optionally, as illustrated in FIG. 20, the chip 2000 further includes the memory 2020. The processor 2010 can invoke and execute the computer programs stored in the memory 2020 to perform the method provided in implementations of the present disclosure.

The memory 2020 may be a separate device independent of the processor 2010, or may be integrated into the processor 2010.

Optionally, the chip 2000 may further include an input interface 2030. The processor 2010 can control the input interface 2030 to communicate with other devices or chips, for example, to acquire information or data sent by other devices or chips.

Optionally, the chip 2000 may further include an output interface 2040. The processor 2010 can control the output interface 2040 to communicate with other devices or chips, for example, to output information or data to other devices or chips.

Optionally, the chip is applicable to the access network device in implementations of the present disclosure. The chip can implement the operations performed by the access network device described in the foregoing method implementations, which will not be repeated herein for the sake of simplicity.

Optionally, the chip is applicable to the mobile terminal/the terminal device in implementations of the present disclosure. The chip can implement the operations performed by the mobile terminal/the terminal device described in the foregoing method implementations, which will not be repeated herein for the sake of simplicity.

It should be understood that, the chip herein may also be referred to as a system level chip, a system chip, a chip system, or an on-chip system chip, etc.

It should be understood that, the processor referred to herein may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in implementations of the present disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). The memory of the systems and methods described herein is intended to include, but is not limited to, these and any other suitable types of memory.

It should be understood that, the above description of the memory is intended for illustration rather than limitation. For example, the memory in implementations of the present disclosure may also be an SRAM, a DRAM, an SDRAM, a DDR SDRAM, an ESDRAM, an SLDRAM, a DR RAM, etc. In other words, the memory in implementations of the present disclosure is intended to include, but is not limited to, these and any other suitable types of memory.

Figure 21:
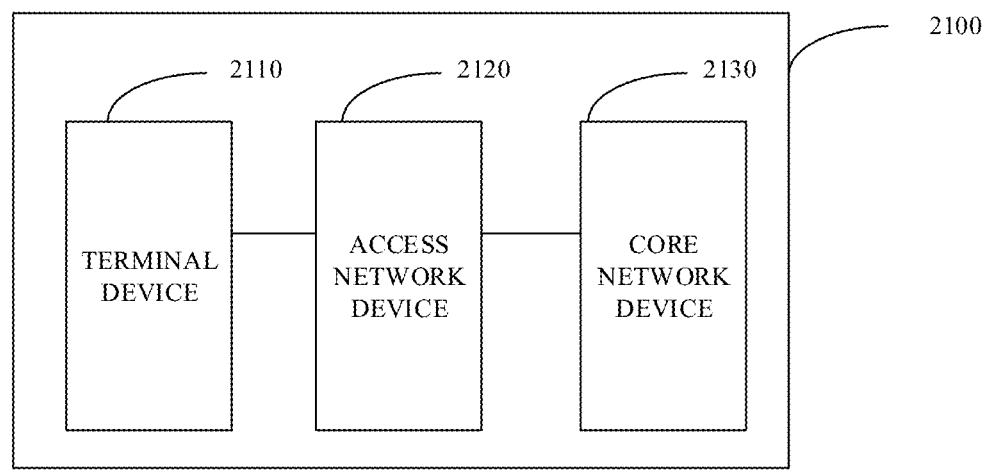
FIG. 21 is a schematic structural diagram of a communication system provided in an implementation of the present disclosure.

FIG. 21 is a schematic structural diagram of a communication system 2100 provided in an implementation of the present disclosure. As illustrated in FIG. 21, the communication system 2100 includes a terminal device 2110, an access network device 2120, and a core network device 2130.

The terminal device 2110 can implement functions of the terminal device described in the foregoing method implementations, the access network device 2120 can implement functions of the access network device described in the foregoing method implementations, and the core network device 2130 can implement functions of the core network device described in the foregoing method implementations, which will not be repeated herein for the sake of simplicity.

A computer readable storage medium is further provided in implementations of the present disclosure. The computer readable storage medium is configured to store computer programs.

Optionally, the computer readable storage medium is applicable to the access network device in implementations of the present disclosure. The computer programs, when executed, are operable with a computer to implement the operations performed by the access network device described in the foregoing method implementations, which will not be repeated herein for the sake of simplicity.

Optionally, the computer readable storage medium is applicable to the mobile terminal/the terminal device in implementations of the present disclosure. The computer programs, when executed, are operable with a computer to implement the operations performed by the mobile terminal/the terminal device described in the foregoing method implementations, which will not be repeated herein for the sake of simplicity.

A computer program product is further provided in implementations of the present disclosure. The computer program product includes computer program instructions.

Optionally, the computer program product is applicable to the access network device in implementations of the present disclosure. The computer program instructions, when executed, are operable with a computer to implement the operations performed by the access network device described in the foregoing method implementations, which will not be repeated herein for the sake of simplicity.

Optionally, the computer program product is applicable to the mobile terminal/the terminal device in implementations of the present disclosure. The computer program instructions, when executed, are operable with a computer to implement the operations performed by the mobile terminal/the terminal device described in the foregoing method implementations, which will not be repeated herein for the sake of simplicity.

A computer program is further provided in implementations of the present disclosure.

Optionally, the computer program is applicable to the access network device in implementations of the present disclosure. The computer program, when executed by a computer, is operable with the computer to implement the operations performed by the access network device described in the foregoing method implementations, which will not be repeated herein for the sake of simplicity.

Optionally, the computer program is applicable to the mobile terminal/the terminal device in implementations of the present disclosure. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations of the present disclosure may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in implementations herein may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, an access network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

The above is only the specific implementations of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

What is claimed is:

1. A data transmission method, comprising:
   transmitting, by a terminal device, an uplink message, wherein the uplink message comprises a first message 3 (MSG3) for accessing a first cell, and the first MSG3 comprises uplink early data stored in non-access stratum (NAS) information, or the uplink message comprises the first MSG3 for accessing the first cell and the uplink early data;
   wherein the first MSG3 carries indication information, and in a case where a serving cell of the terminal device is reselected from a second cell to the first cell and the terminal device has transmitted a second MSG3 for accessing the second cell and fails to receive a reply message 4 (MSG4) for the second MSG3, the indication information indicates that the uplink early data is retransmission data;
   wherein the uplink message is used to cause an access network device to transmit a first message to a core network device to cause the core network device to reserve or discard the uplink early data based on the indication information and a determination of whether the uplink early data is stored before the uplink early data is received, and the first message comprises the uplink early data and the indication information.

2. The method of claim 1, wherein in a case where a serving cell of the terminal device is reselected from a second cell to the first cell and the terminal device has transmitted a second MSG3; for accessing the second cell and receives a reply MSG4 for the second MSG3, the indication information indicates that the uplink early data is not retransmission data.

3. The method of claim 1, wherein in a case where the uplink early data is transmitted through a control plane, the uplink early data is obtained by the terminal device at an access stratum (AS) from a MSG3 buffer.

4. The method of claim 3, further comprising:
   in a case where a serving cell of the terminal device is reselected from a second cell to the first cell, at the AS,
     maintaining, by the terminal device, a media access control (MAC) configuration of the second cell; and
     skipping notifying, by the terminal device, an NAS that the serving cell of the terminal device is reselected from the second cell to the first cell.

5. The method of claim 1, further comprising:
   in a case where the uplink early data is transmitted through a user plane,
     notifying, by an AS of the terminal device, a non-access stratum (NAS) that a serving cell of the terminal device is reselected from a second cell to the first cell.

6. The method of claim 1, wherein transmitting, by the terminal device, the uplink message comprises:
   in a case where the uplink early data is transmitted through a control plane,
     transmitting, by the terminal device, the uplink message, and the method further comprises:
       in a case where the terminal device fails to receive a reply MSG4 for the first MSG3 and a serving cell of the terminal device is reselected from the first cell to a second cell,
         transmitting, by the terminal device, a second MSG4 or accessing the second cell, wherein the second MSG3 comprises the uplink early data, and the uplink early data is obtained by the terminal device at an AS from a MSG3 buffer.

7. The method of claim 6, further comprising:
   in a case where the serving cell of the terminal device is reselected from the first cell to the second cell, at the AS,
     maintaining, by the terminal device, a MAC configuration of the first cell; and
     skipping notifying, by the terminal device, an NAS that the serving cell of the terminal device is reselected from the first cell to the second cell.

8. The method of claim 1, further comprising:
   during early data transmission (EDT),
     restricting, by the terminal device, the terminal device from performing cell reselection until the EDT is completed.

9. The method of claim 8, further comprising:
   setting, by the terminal device, a cell in which the terminal device resides when the EDT is triggered as a cell with a highest priority, wherein
   restricting, by the terminal device, the terminal device from performing cell reselection until the EDT is completed comprises:
     completing, by the terminal device, the EDT based on the cell with the highest priority.

10. A communication device, comprising:
a processor;
a transceiver; and
a memory configured to store computer programs, wherein
the processor is configured to invoke and execute the computer programs stored in the memory to:
cause the transceiver to transmit an uplink message, wherein the uplink message comprises a first message 3 (MSG3) for accessing a first cell, and the first MSG3 comprises uplink early data stored in non-access stratum (NAS) information, or the uplink message comprises the first MSG3 for accessing the first cell and the uplink early data;
wherein the first MSG3 carries indication information, and in a case where a serving cell of a terminal device is reselected from a second cell to the first cell and the terminal device has transmitted a second MSG3 for accessing the second cell and fails to receive a reply message 4 (MSG4) for the second MSG3, the indication information indicates that the uplink early data is retransmission data, wherein
wherein the uplink message is used to cause an access network device to transmit a first message to a core network device to cause the core network device to reserve or discard the uplink early data based on the indication information and a determination of whether the uplink early data is stored before the uplink early data is received, and the first message comprises the uplink early data and the indication information.

11. The device of claim 10, wherein in a case where a serving cell of the terminal device is reselected from a second cell to the first cell and the terminal device has transmitted a second MSG3 for accessing the second cell and receives a reply MSG4 for the second MSG3, the indication information indicates that the uplink early data is not retransmission data.

12. The device of claim 10, wherein in a case where the uplink early data is transmitted through a control plane, the uplink early data is obtained by the terminal device at an access stratum (AS) from a MSG3 buffer.

13. The device of claim 12, wherein the processor is further configured to invoke and execute the computer programs stored in the memory to:
in a case where a serving cell of the terminal device is reselected from a second cell to the first cell, at the AS,
maintain a media access control (MAC) configuration of the second cell; and
skip notifying an NAS that the serving cell of the terminal device is reselected from the second cell to the first cell.

14. The device of claim 10, wherein the processor is further configured to invoke and execute the computer programs stored in the memory to:
in a case where the uplink early data is transmitted through a user plane,
notify a non-access stratum (NAS) that a serving cell of the terminal device is reselected from a second cell to the first cell.

15. The device of claim 10, wherein the processor configured to cause the transceiver to transmit the uplink message is configured to cause the transceiver to:
in a case where the uplink early data is transmitted through a control plane,
transmit the uplink message, and the processor is further configured to invoke and execute the computer programs stored in the memory to cause the transceiver to:
in a case where the terminal device is determined to fail to receive a reply MSG4 for the first MSG3 and a serving cell of the terminal device is reselected from the first cell to a second cell,
transmit a second MSG3 for accessing the second cell, wherein the second MSG3 comprises the uplink early data, and the uplink early data is obtained by the terminal device at an AS from a MSG3 buffer.

16. The device of claim 15, wherein the processor is further configured to invoke and execute the computer programs stored in the memory to:
in a case where the serving cell of the terminal device is reselected from the first cell to the second cell, at the AS,
maintain a MAC configuration of the first cell; and
skip notifying an NAS that the serving cell of the terminal device is reselected from the first cell to the second cell.

17. The device of claim 10, wherein the processor is further configured to invoke and execute the computer programs stored in the memory to:
during early data transmission (EDT),
restrict the terminal device from performing cell reselection until the EDT is completed.

18. A data transmission method, comprising:
receiving, by a core network device, a first message, wherein the first message comprises uplink early data and indication information, and in a case where a serving cell of a terminal device is reselected from a second cell to a first cell and the terminal device has transmitted a second message 3 (MSG3) for accessing the second cell and fails to receive a reply message 4 (MSG4) for the second MSG3, the indication information indicates that the uplink early data is retransmission data;
determining, by the core network device, whether the uplink early data is stored before the uplink early data is received, when the indication information indicates that the uplink early data is retransmission data; and
reserving or discarding, by the core network device, the uplink early data based on a determination of whether the uplink early data is stored.

* * * * *